(12) United States Patent
Dube et al.

(10) Patent No.: US 8,788,310 B2
(45) Date of Patent: Jul. 22, 2014

(54) METHODS AND APPARATUS FOR MANAGING COMPUTING RESOURCES BASED ON YIELD MANAGEMENT FRAMEWORK

(75) Inventors: Parijat Dube, White Plains, NY (US); Zhen Liu, Tarrytown, NY (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 2718 days.

(21) Appl. No.: 10/718,210

(22) Filed: Nov. 20, 2003

(65) Prior Publication Data

US 2005/0114274 A1 May 26, 2005

(51) Int. Cl.
*G06Q 10/00* (2012.01)

(52) U.S. Cl.
USPC .......................................... 705/7.23

(58) Field of Classification Search
USPC .............. 705/7.23, 400, 402, 7.25, 7.28, 7.31
See application file for complete search history.

(56) References Cited

U.S. PATENT DOCUMENTS

| | | | | |
|---|---|---|---|---|
| 5,255,184 | A * | 10/1993 | Hornick et al. | 705/6 |
| 5,270,921 | A | 12/1993 | Hornick | |
| 5,640,569 | A | 6/1997 | Miller et al. | |
| 6,009,407 | A | 12/1999 | Garg | |
| 6,085,164 | A | 7/2000 | Smith et al. | |
| 6,085,169 | A * | 7/2000 | Walker et al. | 705/26 |
| 6,101,484 | A | 8/2000 | Halbert et al. | |
| 6,263,315 | B1 * | 7/2001 | Talluri | 705/8 |
| 6,526,392 | B1 * | 2/2003 | Dietrich et al. | 705/400 |
| 6,526,935 | B2 | 3/2003 | Shaw | |
| 6,567,824 | B2 | 5/2003 | Fox | |
| 6,601,083 | B1 | 7/2003 | Reznak | |
| 6,671,673 | B1 * | 12/2003 | Baseman et al. | 705/7 |
| 2002/0055865 | A1 | 5/2002 | Hammann | |
| 2002/0065699 | A1 | 5/2002 | Talluri | |
| 2002/0120492 | A1 | 8/2002 | Phillips et al. | |
| 2003/0088457 | A1 * | 5/2003 | Keil et al. | 705/10 |
| 2003/0126202 | A1 | 7/2003 | Watt | |
| 2004/0249699 | A1 * | 12/2004 | Laurent et al. | 705/10 |

OTHER PUBLICATIONS

Fong, LL.. et al, Dynamic Resource Management in an EUtility, Aug. 7, 2002.*
U.S. Appl. No. 10/316,251, filed Dec. 10, 2002, Eilam et al.
U.S. Appl. No. 09/832,438, filed Apr. 10, 2001, Liu et al.
U.S. Appl. No. 09/559,065, filed Apr. 28, 2000, Goldszmidt et al.
U.S. Appl. No. 09/543,207, filed Apr. 5, 2000.
Search Report for TW 093134925.

(Continued)

*Primary Examiner* — Mark A Fleischer
(74) *Attorney, Agent, or Firm* — Preston J. Young; Ryan, Mason & Lewis, LLP

(57) ABSTRACT

Yield management techniques are provided. In one aspect of the invention, a technique for managing one or more computing resources comprises the following steps/operations. Data associated with at least one potential demand for use of the one or more computing resources is obtained. Then, a management model (e.g., a yield management model or a revenue management model) is generated in accordance with at least a portion of the obtained data, wherein the management model is operative to determine an allocation of the one or more computing resources based on combinations of price levels and service levels that may be offered to one or more users of the one or more computing resources so as to attempt to satisfy at least one management goal.

17 Claims, 3 Drawing Sheets

(56) References Cited

OTHER PUBLICATIONS

A. Byde et al., "Market-Based Resource Allocation for Utility Data Centers," Hewlett Packard Tech Report, Sep. 2003, pp. 1-15.

X. Zhu et al., "Optimal Resource Assignment in Internet Data Centers," IEEE Proceedings of the Ninth International Symposium on Modeling, Analysis, and Simulation of Computer and Telecommunications Systems, Aug. 2001, pp. 61-69, Cincinnati, Ohio, USA.

* cited by examiner

METHODS AND APPARATUS FOR MANAGING COMPUTING RESOURCES BASED ON YIELD MANAGEMENT FRAMEWORK

FIELD OF THE INVENTION

The present invention relates to techniques for managing computing resources and, more particularly, to techniques for managing computing resources based on a yield management framework.

BACKGROUND OF THE INVENTION

It is known that a group of computing resources that perform one or more related functions may be referred to as a "computing center." Typically, a computing center may be composed of a number of processor resources (e.g., servers), disk storage, applications, software tools, and internal communication links between the various devices and with the external clients. Clients send their jobs to the system through an external network and jobs are queued and processed through the system. Results may be received by clients during the process or only at the end of the process. Computing centers may take on a number of forms such as, for example, web server farms, scientific computing centers, or on-demand facilities for general computing use. However, all such forms may have a number of underlying common features.

Existing resource management techniques used in computing centers aim to satisfy constraints associated with the computing needs of the current clients of the system. Thus, consideration of the computing needs of a client to a computing center, as handled by an existing resource management system, essentially only takes into account processor power and required memory. However, consideration of the definition and pricing of service offerings on the system is typically handled separate from and independent of the resource management system.

Some recent work described in the U.S. patent application identified as Ser. No. 09/832,438, filed on Apr. 10, 2001, and entitled "Apparatus and Methods for Maximizing Service-Level-Agreement Profits," involves combining more detailed, service-oriented characteristics, such as "service classes," and performing the resource allocation to those clients with the goal of revenue maximization through some unit revenue for job satisfaction and some unit cost (penalty) for non-satisfaction of the service level agreement offered to that "service class."

However, this latter methodology, while it may consider revenue in view of resource allocation, it does not allow, as controls, anything other than the resource allocation (that is, the answer to the question "where is the client's request placed in the system?") and the job scheduling (that is, the answer to the question "in what order are the requests carried out at each location of the system?"). In other words, the above methodology takes as given, some fixed revenue or cost that accrues to the system owner/manager if the request is satisfied or not.

Further, in U.S. Pat. No. 6,526,392, issued on Feb. 25, 2003, and entitled "Method and System for Yield Managed Service Contract Pricing," a method determines a single price for a generic "service" from the value of the optimal cost of the service evaluated at one more "unit" of the service. The generic service should then charge that price, which is computed as the difference in cost to the firm of providing one extra unit of service. However, in such a method, a service offering is defined only by the single price.

Thus, a need exists for improved management techniques associated with computing centers.

SUMMARY OF THE INVENTION

The present invention provides yield management techniques. It is to be understood that such yield management techniques may be implemented in accordance with existing resource management tools. For example, a management model computed in accordance with the present invention may interface with one or more existing resource management models, and advantageously take into account demand-side information and significant potential revenue changes due to price and demand segmentation.

In one aspect of the invention, a technique for managing one or more computing resources comprises the following steps/operations. Data associated with at least one potential demand for use of the one or more computing resources is obtained. Then, a management model (e.g., a yield management model or a revenue management model) is generated in accordance with at least a portion of the obtained data, wherein the management model is operative to determine an allocation of the one or more computing resources based on combinations of price levels and service levels that may be offered to one or more users of the one or more computing resources so as to attempt to satisfy at least one management goal.

Further, the management model generating step/operation may further comprise determining the allocation also based on at least one of historical data and predicted data associated with a demand pattern, and/or based on at least one of historical data and predicted data associated with a resource usage level. The management model generating step/operation may further comprise representing the potential demand as one of a demand curve and a discrete choice model. The management model generating step/operation may further comprise aggregating at least one of historical data and predicted data associated with a resource usage level.

Still further, the management model generating step/operation may further comprise setting price levels and service levels to be offered to users. The setting step/operation may be based on at least one of current data and predicted data. At least one of current data and predicted data may comprise at least one of demand data and resource data. The setting step/operation may also be based on a maximum number of price-service-level combinations. The management model generating step/operation may further comprise evaluating a revenue value for each price-service-level combination. The management model generating step/operation may further comprise solving the management model using one of a linear programming solver and a nonlinear programming solver.

Also, the management goal may be at least one of: (i) achieving a revenue goal; (ii) increasing a market share; (iii) responding to a competitor; and (iv) smoothing a demand pattern. The one or more computing resources may be associated with an electronic utility. The one or more computing resources may be associated with a computing center.

In another aspect of the invention, a technique for providing a service, in accordance with a service provider, to manage one or more computing resources comprises a service provider deploying a system operative to: (i) obtain data associated with at least one potential demand for use of the one or more computing resources; and (ii) generate a management model in accordance with at least a portion of the obtained data, wherein the management model is operative to determine an allocation of the one or more computing resources based on combinations of price levels and service levels that may be offered to one or more users of the one or more computing resources so as to attempt to satisfy at least one management goal.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
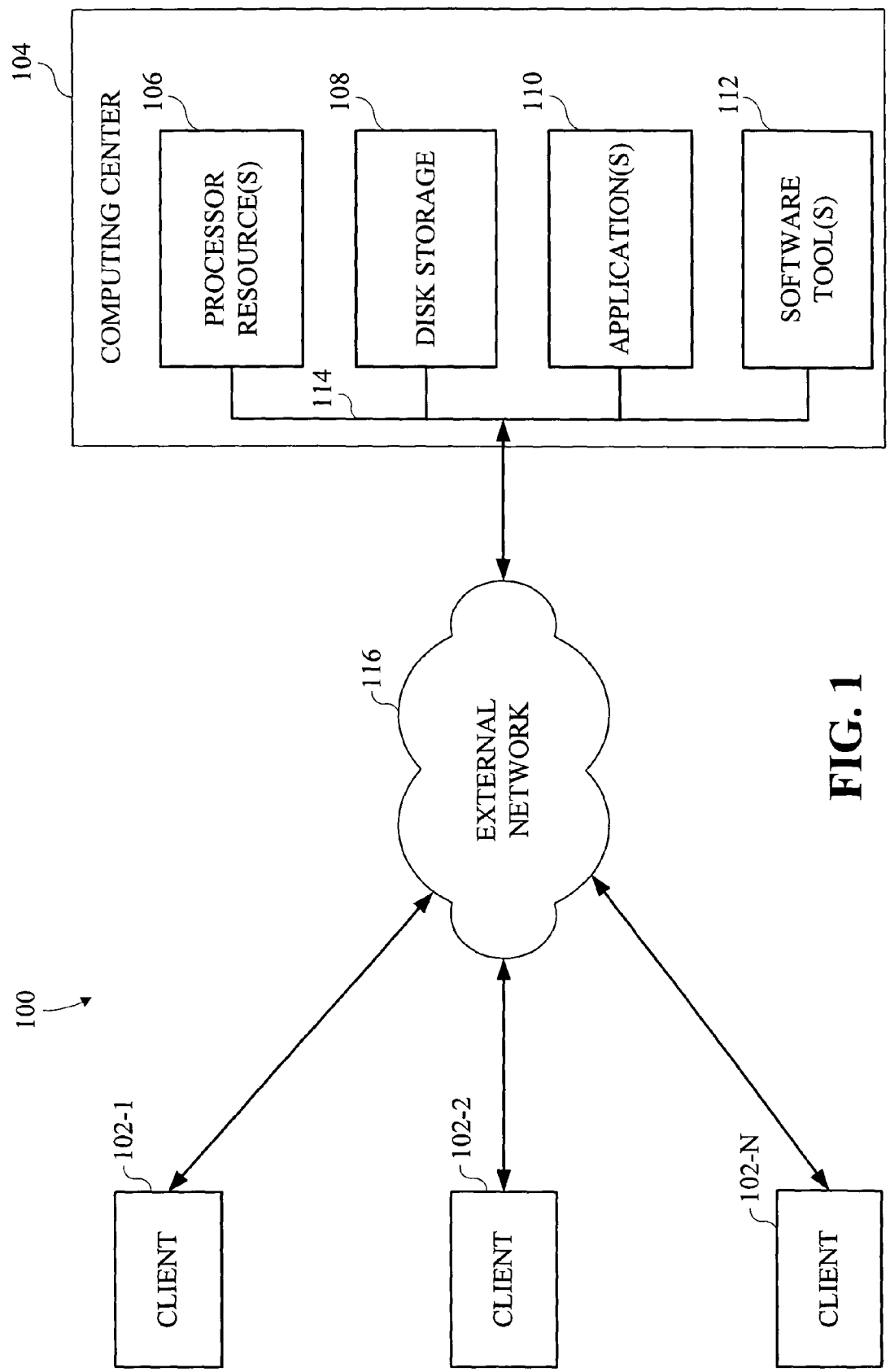
FIG. 1 is a block diagram illustrating a computing center environment with which techniques of the present invention may be implemented.

The present invention may be described below, at times, in the context of an electronic utility (e-utility) application (by way of example only, a web-hosting center, a computation on-demand facility, etc.). However, it is to be understood that the invention is not limited to use with any particular application but is rather more generally applicable for use in accordance with any application in which it is desirable to provide effective computing resource management.

Before providing detailed descriptions of the inventive techniques, some terms used herein will be generally defined.

A "demand," as generally used in accordance with the invention, refers to an estimate of the likely number of users or requests to the system, and generally depends upon the characteristics of the system. For example, the better the system, the higher the demand.

A "price" is a characteristic of the system that, as generally used in accordance with the invention, refers to the cost paid by a user of the system for the use or request in question.

A "service-level" is also a characteristic of the system that, as generally used in accordance with the invention, refers to non-monetary attributes of the service provided, e.g., processing time, reliability, guarantee of access, etc.

A "product," as generally used in accordance with the invention, refers to a price-service-level pair or combination. For example, use of capacity in a hosting facility may be offered at a certain price and with a particular guarantee of access. Then, the same capacity at a different price and/or with a different guarantee of access is a different product.

The present invention realizes that the range of controls available to an owner/manager of a computing center can be considerably expanded by incorporating characteristics of the clients themselves into the decision model, and allowing prices to be optimally set as a function of those client characteristics, the resource allocation at hand, and predictions about future loads on the system. That is, the invention provides a unique approach to resource management, based not on supply-side characteristics only, but combining them with demand-side data and predictions. Some features of the invention include the ability to modulate prices and service offerings with congestion levels (predicted and actual) and a fine-grained segmentation of the demand that sets limits on the lower-priced offerings as a function of likely buy-up potential of the customer base.

Thus, as will be illustratively explained in detail herein, the present invention provide techniques for the coupling of resource allocation, service offering definition and offer pricing, and revenue maximization for e-utility computing centers. The techniques are based on an optimization framework, which segments the demand using data on price/service-level elasticities (also known as price/service-level sensitivity, elastic demand curves, etc.) that relate levels of demand to price and service-levels offered to the clients. Using such data, as well as data on the current and forecasted use of the resources (resource management data), the invention determines the quantity and characteristics of each product (price/service combination) offered to clients that maximizes expected revenues.

In addition, the invention may combine information on current and predicted loads on the resources to direct prices and service offerings to induce smoother realized load levels by inciting customers to shift their usage behavior through targeted pricing and service offering modulation.

While a so-called yield management approach has been used in the passenger airline reservation industry by way of pricing the same airline seat at different prices depending on demand and availability, yield management in such a context is not the same as yield management in accordance with the invention. The yield management concept of the invention provides techniques for computing a set of prices and a set of service-levels to offer a potential customer at each price, derived from both the resource levels and historical and predicted demand data.

In particular, in the context of a computing center, the present invention realizes that a service offering is not defined only by its price. Rather, the computing center is composed of heterogeneous equipment (differing by functionality, processing speed, bandwidth, etc.) and user requests are not for a generic "seat" but rather for a user-specific job, which has a user-specific size to it, and therefore a variable processing time. In addition, this processing time depends upon the equipment upon which the computing center chooses, optimally, to allocate to the job. As such, yield management concepts of the invention have many critical differences as compared to yield management in a passenger airline reservation system, and may typically have a far greater degree of complexity.

Furthermore, since resource management techniques associated with computing centers are typically not implemented in isolation, as a computing center functions already with existing software to perform allocations, provisioning, and scheduling of jobs on machines, the techniques of the invention may be integrated in constraint-based, throughput-based and/or revenue-based resource management and scheduling systems.

Referring initially to FIG. 1, a block diagram illustrates a computing center environment with which techniques of the present invention may be implemented. As shown, computing center environment 100 comprises: a plurality of clients 102-1, 102-2, . . . 102-N; a computing center 104 itself comprising processor resource(s) 106 (e.g., one or more servers), disk storage 108, application(s) 110, software tool(s) 112, and internal communication links 114 between the various components and with the external clients; and an external network 116. By way of example only, external network 116 may be the Internet or World Wide Web. Further, by way of example only, applications 110 may comprise database programs, office or management software, scientific applications, etc.;

while software tools 112 may comprise software that enables other applications and services on the system, middleware, etc.

In general, clients 102-1, 102-2, ..., 102-N send their jobs (more generally, requests) to computing center 104 through external network 116 and jobs are queued and processed through computing center 104. Results generated by computing center 104 may be received by clients during the process or only at the end of the process. While the invention is not limited to any particular form of a computing center, computing center 104 may represent a web server farm, a scientific computing center, and/or an on-demand facility for general computing use.

Figure 2:
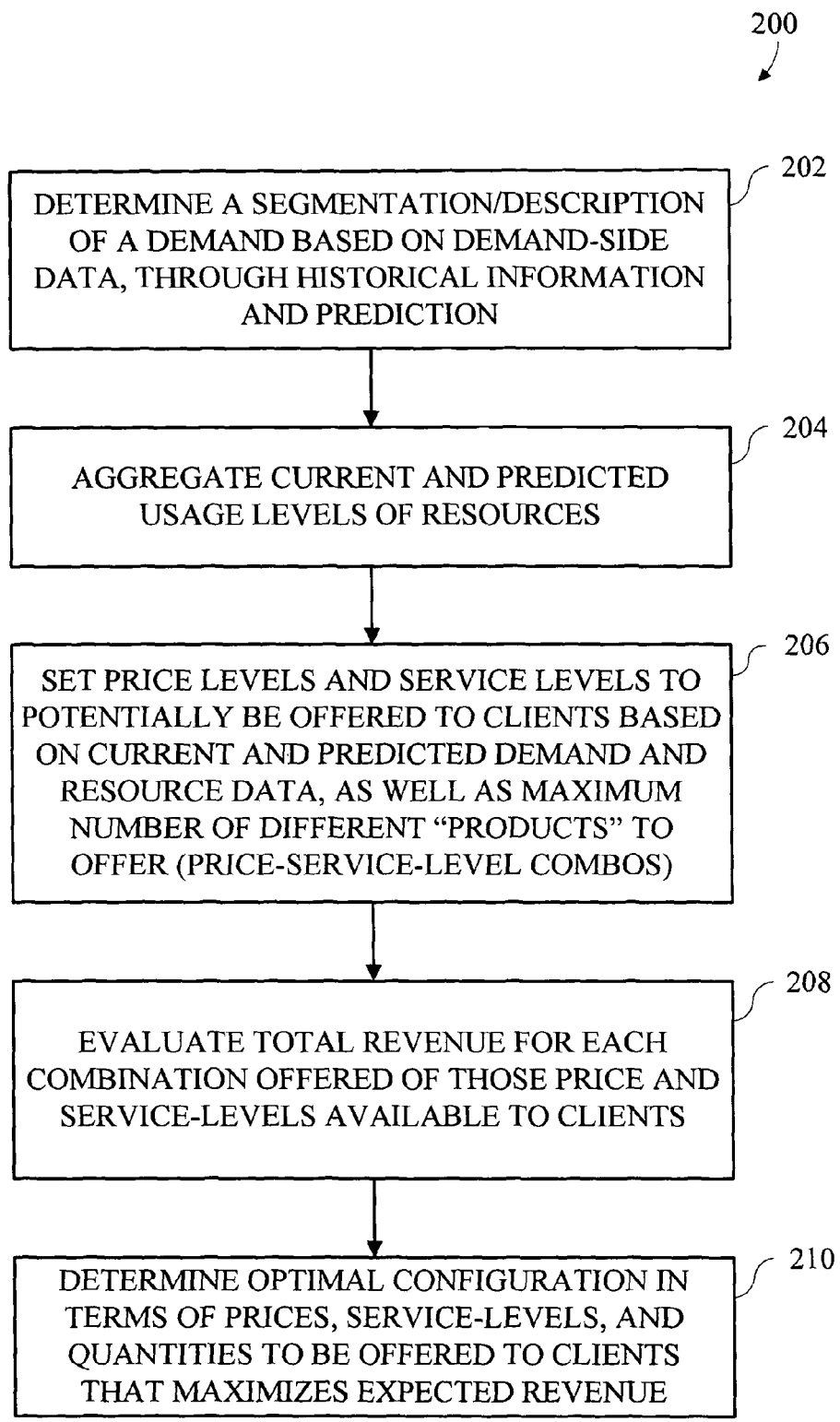
FIG. 2 is a flow diagram illustrating a yield management methodology according to an embodiment of the present invention.

Referring now to FIG. 2, a flow diagram illustrates a yield management methodology according to an embodiment of the present invention. It is to be understood that the methodology may also be referred to herein as a "revenue management methodology."

In general, the methodology combines resource allocation and determination of prices, service-levels, and quantities to be offered to clients of a computing center to accomplish revenue maximization. The methodology formulates a yield management model (also referred to as a revenue management model) that seeks to maximize revenue through segmentation of the potential client demand, through incorporating the current and predicted load of the system, and taking into account the costs, penalties and information on possible ranges of prices based on cost, competitors' and current usage data, and finally, through defining the "products" to offer at any point in time, based on that data. This formulation yields the quantities of each type of "product" (i.e., price, service-level combination) that should be offered to achieve a relevant goal or set of goals, such as maximizing revenues, increasing market share, and smoothing load patterns over time.

In particular, as illustrated in FIG. 2, the invention provides yield management methodology 200 for combining the allocation of resources of a computing center with the optimal setting of the quantity and characteristics of each product (i.e., price and service-level) to offer to clients, with the goal of maximizing the revenues of the system owner/manager.

It is to be understood that such a methodology may be performed automatically (e.g., wholly executed by one or more computer systems) and/or semi-automatically (e.g., executed by one or more computer systems in combination with one or more system administrators). For example, the methodology may be executed in whole or in part by at least a portion of processor resources 106 (FIG. 1) associated with computing center 104. Alternatively, the steps of the methodology may be executed on a stand-alone computer system coupled to the computing center but substantially dedicated to computing resource management functions. In any case, the computer system used to implement the methodology may be referred to herein as a "yield management system" or a "revenue management system."

It is to be understood that the steps of methodology 200 will first be generally stated, with a detailed explanation of each step given in the subsections to follow.

Thus, in step 202 (subsection A below), methodology 200 determines a segmentation/description of a demand based on demand-side data, through historical information and prediction.

In step 204 (subsection B below), methodology 200 aggregates the current and predicted usage levels of the resources.

In step 206 (subsection C below), methodology 200 sets price levels and service levels to potentially be offered to clients based on the current and predicted demand and resource data, as well as a maximum number of different "products" to offer (price-service-level combinations).

In step 208 (subsection D below), methodology 200 evaluates the total revenue for each combination offered of those price and service-levels available to clients.

Lastly, in step 210 (subsection E below), methodology 200 determines an optimal configuration of the resources of the computing center in terms of prices, service-levels, and quantities to be offered to clients that maximizes the expected revenue of the computing center.

A. Determining a segmentation/description of the demand based on demand-side data (step 202):

This step involves obtaining a representation of the demand for the use of the computing center. The demand can be defined in a number of ways, such as an explicit analytical function of demand for the "product" (price-service-level) as a function of both the price and service-level. The forms of such functions are well understood in the general marketing and economics literature, and should have basic properties such as demand decreasing in price at a given service quality level, and demand increasing with increasing service quality. The precise shape of these curves can be estimated from historical data (calibrated) and demand predictions can then be made by forecasting increases or decreases in the data that served to calibrate the curve, and recalibrating.

A different method for describing demand for the computing center is known as discrete choice modeling, and involves using so-called preference functions that give the percentage of the total user population that is likely to choose among the (discrete set of) possibilities. In this case, the set of possibilities are the price-service-level offerings (that have been referred to herein as "products"). The percentage of the demand for each choice is given by a stochastic model that incorporates "perception error" into the choices. The principal models in use today are based upon either the Weibull distribution, giving rise to the "logit discrete choice model," or the Gaussian distribution of perception error, giving rise to the "probit discrete choice model," see, e.g., M. Ben-Akiva et al., "Discrete Choice Analysis: Theory and Application to Travel Demand," MIT Press, 1985.

Like the demand curve described above, these discrete choice models can be calibrated in a straightforward manner based upon historical data about the choices made in the past and the parameters of the offerings of those choices (e.g., their prices, qualities, market conditions, etc.). Similarly, forecasts can be made by projecting new values for the input data and re-deriving a forecasted logit model.

B. Aggregating the current and predicted usage levels of the resources (step 204):

The current and future (predicted) resource levels should be quantified for the methodology to provide a set of optimal future actions and offering characteristics. In the simplest setting, this may be the capacity level of each piece of equipment. For example, the load level on machines (e.g., processing resources) 1-5 of type X may be 70%, the load level of machine 6 of type Y may be 85%, the bandwidth used between equipment Y and Z may be 50%, etc.

In addition to instantaneous usage levels, the usage levels for the rest of the planning period should also be known. This includes the fact that the jobs which are currently using, for example, machines 1-5 will finish if left uninterrupted in T1 hours, while that on machine 6 if uninterrupted will finish in T2 hours, etc. It also includes reservations made for future time periods. Finally, it can include forecasts of future loads.

This data is aggregated into the form of capacity levels per equipment type per time period, where time is divided into periods according to the minimum and maximum durations of jobs into the system.

C. Setting levels of prices and services to potentially be offered to clients based on the current and predicted demand and resource data, as well as a maximum number of different "products" (price-service-level combinations) to offer (step 206):

The third initialization step is to set the reasonable range of price levels for the service offerings, which are defined by the types of equipment available, for example, their processing speeds, etc. In addition, a maximum number of price classes for each service quality type can be determined in advance.

In addition to the number of price-service quality types to offer, the range of reasonable prices should be input. For example, for a unit time slice on a computing center facility, the minimum price may be $1 (per minute, hour, etc.). This type of data should be input into the model at the outset.

Finally, if there is a maximum price obtained by examining competitors or by making a reasonable guess, then this too can be input at this initialization phase.

D. Evaluating the total revenue for each combination offered of those price and service-levels available to clients (step 208):

With the data from steps 202, 204 and 206 input into the model, it is possible to evaluate, through an optimization program, the total revenue (or other measure) associated with each configuration of the parameter, namely the prices, quantities to offer at each price and similarly for each service-level, for each point in time during the planning period.

Based on evaluations of the revenue objective at each configuration, by running an optimization program to convergence, an optimal solution and set of parameters may be obtained.

E. Determining the optimal configuration in terms of prices, service-levels, and quantities to be offered to clients that maximizes the expected revenue of the system (step 210):

The optimal solution can be obtained by using a nonlinear programming solver on the resulting mathematical model, one exemplary implementation of which is provided below. Many such solvers are commercially available; others are distributed freely available. Applicable algorithms for constrained nonlinear programming may be found in numerous textbooks, for example, in D. P. Bertsekas, "Nonlinear Programming," 2nd ed. Cambridge, Mass.: Athena Scientific, 1999.

Further, the solver may preferably be part of the computer system implementing the yield management techniques of the invention. Alternatively, the computer system implementing the yield management techniques of the invention may call a solver located on a host machine or remotely from the computer system.

In simple versions of the inventive methodology, a linear programming solver may be used. One of the most widely used linear programming algorithms is the simplex method. A description may be found in numerous textbooks, for example, in S. G. Nash et al., "Linear and Nonlinear Programming," McGraw-Hill, 1996. For example, such a solver may be employed if the random quantities are expressed in terms of their expected (mean) values, and functional relationships for job sojourn time are externally given. In more complex cases, however, a nonlinear programming solver algorithm may be employed.

The output of the mathematical model would then be the set of prices to offer, and quantities available at each price for each service-quality type. For example, the output may be the number of CPU (central processing unit) units to offer on the machine of speed S1 at price P1, to offer at time T1, T2, etc., and the same for the other optimal price levels at each machine speed.

Given the above detailed description of a yield management methodology according to the invention, we now turn to a description of techniques for using the methodology to perform additional objectives such as increasing market share (e.g., through promotions, whose reduced prices and quantities can be determined optimally), responding to a competitor (e.g., by offering a highly limited number of low-cost or better quality-of-service offerings), or smoothing demand (e.g., by inducing higher usage at low-use times of day/week).

Using the management framework described above, it is straightforward to implement specialized objectives, which are valid at different times, based on market or resource conditions. These alternate objectives require no new tool or methodological development but only require re-running the mathematical model with specialized data inputs in each case. Below we discuss the three specialized objectives described above:

1. Increasing market share (e.g., through promotions, whose reduced prices and quantities can be determined optimally):

At times when it is desirable to offer special promotions to increase market share, it is possible to do so in an optimal manner using a yield management system of the invention. In particular, consider the following example:

New demand data can be obtained through marketing studies or interviews that a new set of users may be interested in using the computing center. In order to attract new clientele, one could announce special low cost promotions for a restricted time. Adding the new demand information (if available) to the model, and reducing substantially the minimum price (see subsection C above), and then rerunning the mathematical model, the output will contain a new set of optimal prices and quantities of each for each type of service-level. These will still be calculated to optimize the revenue based on the new promotion and lower introductory costs.

2. Responding to a competitor (e.g., by offering a highly limited number of low-cost or better quality-of-service offerings):

Similarly to 1, above, if a competitor offers a promotion or new pricing structure, it is possible to respond quickly and optimally by lowering the minimum price level to the competitor's and recalculating the optimal offering structure (quantities to offer at each price and service-level). If new demand data can be obtained following the competitor's price change, then this should be added to the model as well.

3. Smoothing demand (e.g., by inducing higher usage at low-use times of day/week):

A different objective is to smooth the demand level over time, or equivalently, smooth the usage level to reduce peak-time bursts. By offering promotions (described above) and price incentives, valid for low-use time of day or of the week, the usage patterns can be effectively smoothed across time. In order to determine the best way to achieve the goal of smoothing with the yield management tool of the invention, different scenarios can be tested and compared as this objective of smoothing usage patterns.

For example, consider that one wishes to define a new price-service offering policy which will shift some usage from Fridays to weekends and possibly add new customers for weekends, to make better use of idle capacity. By testing different minimum prices for weekend periods (all being lower than the present level), and higher minimum levels on Fridays, and by observing the predicted response (optimal quantities available at each price level at each time period), and the resulting revenue, one can make an informed decision about how to set promotional weekend prices to achieve the objective of smoothing demand by bringing more usage on the weekends. Similarly, one can offer, for the same price, higher quality levels (e.g., faster processing speeds) to achieve the same objective as with limited quantity low-price promotions for weekends and higher prices on Fridays.

Next, we present an exemplary implementation of the inventive techniques described through a particular set of mathematical equations for an example application, and information on the algorithmic method for solving them. The model takes the form of a nonlinear optimization problem, with the following notation being used in this implementation. Consider:

A set of heterogeneous computing resources, such as used in server farms, distributed computing, grids, application utilities, etc.

A pool of nodes, or computing resources to allocate ($N_q$) and storage (S).

Define a node class as q, which is characterized by processing speed, for servers, bandwidth, for networks, and other relevant parameters, for q=1 ... Q.

Define workload types, ($W_c$), and probabilities of arrival of each job type, ($\Gamma_c$), for c=1 ... C.

Define a goal: Expected value of the optimal allocation of $N_q$ and S at each decision epoch to maximize revenue by using highly segmented pricing and offering structures.

In particular, determine the optimal number of "slots" ($n_{ikq}$, $S_i$) to offer for each service type, q, at each price ($r_{ikq}$ are the price levels for each of the "slots," and $p_{ik}$, the price levels for storage) at each time period, i, so as to optimize the goal.

Obtain relevant data:

An estimation of the sojourn time of a unit job according to node type (T(q)).

A model of user preferences using demand curves or discrete choice models, e.g., logit choice probability functions, referred to as ($P_k$).

Set maximum number of price classes per service type, K.

Set planning period (number of individual time periods), I.

Solve:

$$\max_{n_{ikq} \geq 0, S_i \geq 0} E$$

$$\left[ \sum_{c=1}^{C} \sum_{i=1}^{I} \sum_{k=1}^{K} T_i(W_c, n_{ikq}, c) \left( \sum_{q=1}^{Q} r_{ikq} n_{ikq} + p_{ik} S_i \right) P_k(W_c, S_i) \Gamma_c \right]$$

$$\forall i, q$$

$$N_q - \sum_{k, z \leq i, z + T_i > i} n_{zkq} \geq 0,$$

$$\forall i$$

$$S - \sum_{k, z \leq i, z + T_i > i} S_z \geq 0,$$

To solve the above mathematical model, nonlinear programming solving routines may be used. In simple cases, in which preference functions, P, and sojourn times, T, are replaced by constants, linear programming solving routines may be used.

Figure 3:
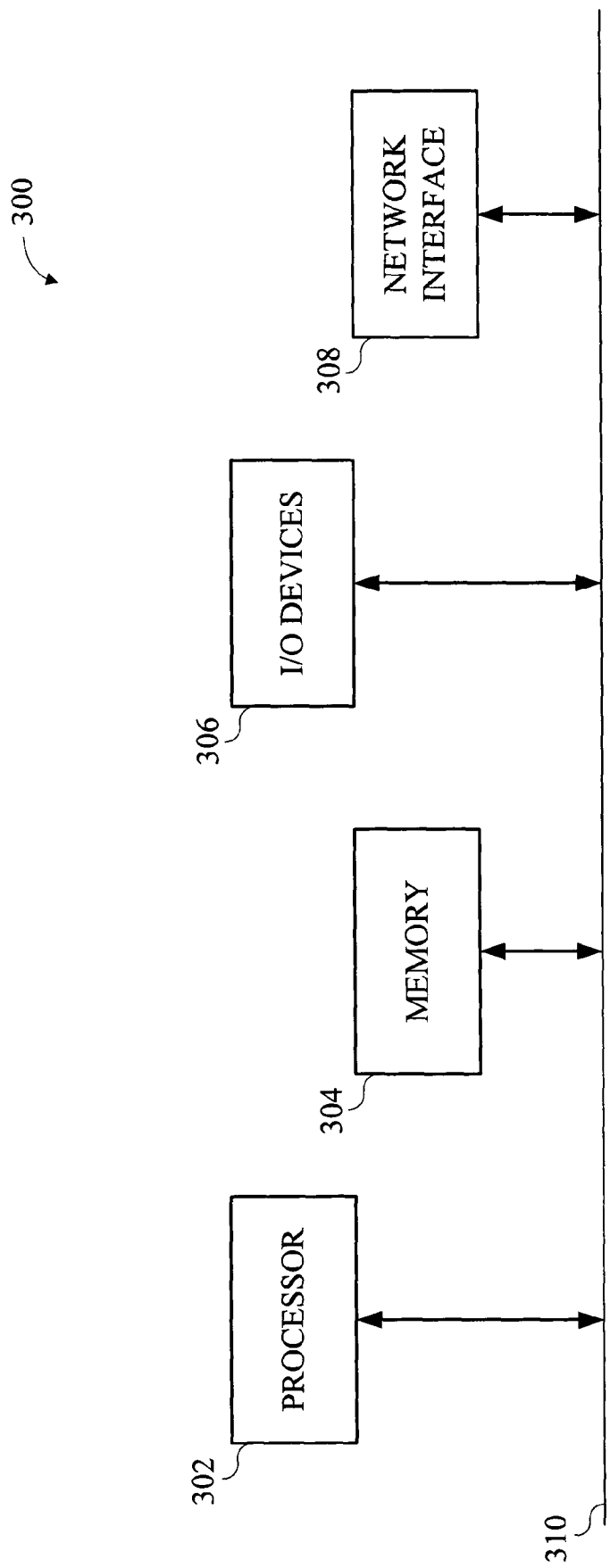
FIG. 3 is a block diagram illustrating a generalized hardware architecture of at least a portion of a computer system suitable for implementing a yield management system according to an embodiment of the present invention.

Referring lastly to FIG. 3, a block diagram illustrates a generalized hardware architecture of at least a portion of a computer system suitable for implementing a yield management system (e.g., a revenue management system) according to an embodiment of the present invention. More particularly, FIG. 3 depicts an illustrative hardware implementation of at least a portion of a computer system in accordance with which one or more components/steps of a yield management system (e.g., components/steps described in the context of FIGS. 1 through 2) may be implemented, according to an embodiment of the present invention. The illustrative architecture of FIG. 3 may also be used in implementing any and all of the components of computing center 104 and clients 102 (FIG. 1).

Further, it is to be understood that the individual components/steps may be implemented on one such computer system, or more preferably, on more than one such computer system. In the case of an implementation on a distributed system, the individual computer systems and/or devices may be connected via a suitable network, e.g., the Internet or World Wide Web. However, the system may be realized via private or local networks. The invention is not limited to any particular network.

As shown, the computer system 300 may be implemented in accordance with a processor 302, a memory 304, I/O devices 306, and a network interface 308, coupled via a computer bus 310 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also comprises techniques for providing computing resource management services.

By way of example, a service provider agrees (e.g., via a service level agreement or some informal agreement or arrangement) with a service customer or client to provide computing resource management services. That is, by way of one example only, the service provider may host the customer's web site and associated applications (e.g., e-commerce applications). Then, in accordance with terms of the contract between the service provider and the service customer, the service provider provides yield management services which may comprise one or more of the methodologies of the invention described herein. By way of example, this may also include automatically controlling one ore more resources so as to optimize performance of such resources to the benefit of the service customer.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of managing one or more computing resources, the method comprising executing the following steps:
   obtaining data associated with at least one potential demand for use of the one or more computing resources;
   generating a management model in accordance with at least a portion of the obtained data, wherein the management model is operative to determine an allocation of the one or more computing resources based on products, comprising combinations of price levels and service levels, that may be offered to one or more users of the one or more computing resources so as to attempt to satisfy at least one management goal, wherein the combinations are determined by (i) computing a set of prices and (ii) computing a set of service levels to offer to the one or more users at each one of the prices in the set of prices, and wherein the set of prices and the set of service levels are derived from: (i) levels associated with the one or more computing resources; (ii) historical demand data; and (iii) predicted demand data;
   evaluating the satisfaction of the management goal for each combination associated with the management model;
   determining an optimal configuration of the one or more computing resources, in accordance with the management model, that maximizes the management goal, wherein the optimal configuration is determined by solving the management model using one of a linear programming solver and a nonlinear programming solver; and
   controlling a usage load level of the one or more computing resources by modulating quantities of products offered to the one or more users of the one or more computing resources; wherein the steps are executed by one or more computers.

2. The method of claim 1, wherein the management model generating step further comprises determining the allocation also based on at least one of historical data and predicted data associated with a demand pattern.

3. The method of claim 1, wherein the management model generating step further comprises determining the allocation also based on at least one of historical data and predicted data associated with a resource usage level.

4. The method of claim 1, wherein the management model generating step further comprises representing the at least one potential demand as one of a demand curve and a discrete choice model.

5. The method of claim 1, wherein the management model generating step further comprises aggregating at least one of historical data and predicted data associated with a resource usage level.

6. The method of claim 1, wherein the management model generating step further comprises setting price levels and service levels to be offered to users.

7. The method of claim 6, wherein the setting step is based on at least one of current data and predicted data.

8. The method of claim 6, wherein the at least one of current data and predicted data comprises at least one of demand data and resource data.

9. The method of claim 6, wherein the setting step is also based on a maximum number of price-service-level combinations.

10. The method of claim 9, wherein the management model generating step further comprises evaluating a revenue value for each price-service-level combination.

11. The method of claim 1, wherein the management goal is at least one of: (i) achieving a revenue goal; (ii) increasing a market share; (iii) responding to a competitor; and (iv) smoothing a demand pattern.

12. The method of claim 1, wherein the one or more computing resources comprise a computing center.

13. The method of claim 1, wherein the one or more computing resources comprise an electronic utility.

14. The method of claim 1, wherein the management model comprises a yield management model.

15. The method of claim 1, wherein the management model comprises a revenue management model.

16. An apparatus for managing one or more computing resources, the apparatus comprising:
   a memory; and
   at least one processor coupled to the memory and configured to: obtain data associated with at least one potential demand for use of the one or more computing resources; generate a management model in accordance with at least a portion of the obtained data, wherein the management model is operative to determine an allocation of the one or more computing resources based on products, comprising combinations of price levels and service levels, that may be offered to one or more users of the one or more computing resources so as to attempt to satisfy at least one management goal, wherein the combinations are determined by (i) computing a set of prices and (ii) computing a set of service levels to offer to the one or more users at each one of the prices in the set of prices, and wherein the set of prices and the set of service levels are derived from: (i) levels associated with the one or more computing resources; (ii) historical demand data; and (iii) predicted demand data; evaluate the satisfaction of the management goal for each combination associated with the management model; determine an optimal configuration of the one or more computing resources, in accordance with the management model, that maximizes the management goal, wherein the optimal configuration is determined by solving the management model using one of a linear programming solver and a nonlinear programming solver; and control a usage load level of the one or more computing resources by modulating quantities of products offered to the one or more users of the one or more computing resources.

17. An article of manufacture for managing one or more computing resources, comprising a computer readable storage medium containing one or more programs which when executed implement the steps of:
   obtaining data associated with at least one potential demand for use of the one or more computing resources;
   generating a management model in accordance with at least a portion of the obtained data, wherein the management model is operative to determine an allocation of the one or more computing resources based on products, comprising combinations of price levels and service levels, that may be offered to one or more users of the one or more computing resources so as to attempt to satisfy at least one management goal, wherein the combinations are determined by (i) computing a set of prices and (ii) computing a set of service levels to offer to the one or more users at each one of the prices in the set of prices, and wherein the set of prices and the set of service levels are derived from: (i) levels associated with the one or more computing resources; (ii) historical demand data; and (iii) predicted demand data;

evaluating the satisfaction of the management goal for each combination associated with the management model;

determining an optimal configuration of the one or more computing resources, in accordance with the management model, that maximizes the management goal, wherein the optimal configuration is determined by solving the management model using one of a linear programming solver and a nonlinear programming solver; and controlling a usage load level of the one or more computing resources by modulating quantities of products offered to the one or more users of the one or more computing resources; wherein the steps are executed by one or more computers.

* * * * *